United States Patent [19]

Megeid

[11] Patent Number: 5,402,330

[45] Date of Patent: Mar. 28, 1995

[54] SWITCH MODE POWER SUPPLY WITH REDUCED INPUT CURRENT DISTORTION

[75] Inventor: Magdy Megeid, Zurich, Switzerland

[73] Assignee: RCA Thomson Licensing Corporation, Princeton, N.J.

[21] Appl. No.: 264,583

[22] Filed: Jun. 23, 1994

Related U.S. Application Data

[63] Continuation of Ser. No. 77,160, Jun. 16, 1993, abandoned, which is a continuation of Ser. No. 865,159, Apr. 8, 1992, abandoned.

[30] Foreign Application Priority Data

Jun. 13, 1991 [GB] United Kingdom ............ 9112727
Jan. 27, 1992 [GB] United Kingdom ............ 9201701

[51] Int. Cl.⁶ .................................. H02M 3/335
[52] U.S. Cl. .................................. 363/21; 363/97; 315/411; 348/730
[58] Field of Search ........... 363/16, 20, 21, 97, 363/131; 358/190; 315/411

[56] References Cited

U.S. PATENT DOCUMENTS

| | | | |
|---|---|---|---|
| 4,109,307 | 8/1978 | Knoll | 363/101 |
| 4,302,717 | 11/1981 | Olla | 323/282 |
| 4,315,305 | 2/1982 | Siemon | 363/88 |
| 4,459,651 | 7/1984 | Fenter | 363/21 |
| 4,486,823 | 12/1984 | Palm | 363/21 |
| 4,530,043 | 7/1985 | Palm et al. | 363/21 |
| 4,564,897 | 1/1986 | Okamoto et al. | 363/132 |
| 4,680,511 | 7/1987 | Fitzgerald et al. | 315/411 |
| 4,689,730 | 8/1987 | Kimura | 363/21 |
| 4,761,723 | 8/1988 | Lendaro | 363/21 |
| 4,766,528 | 8/1988 | Marinus | 363/21 |
| 4,930,060 | 5/1990 | Leonardi | 363/21 |
| 4,975,592 | 12/1990 | Hahn et al. | 363/21 X |
| 4,975,823 | 12/1990 | Rilly et al. | 363/21 X |
| 5,010,281 | 4/1991 | Rodriguez-Cavazos | 315/411 |
| 5,126,930 | 6/1992 | Ahn | 363/21 |
| 5,146,394 | 9/1992 | Ishii et al. | 363/21 X |
| 5,161,241 | 11/1992 | Kanai | 363/21 X |
| 5,189,600 | 2/1993 | Keck et al. | 358/190 X |
| 5,349,515 | 9/1994 | Megeid | 363/21 |
| 5,349,516 | 9/1994 | Megeid | 363/21 |

FOREIGN PATENT DOCUMENTS 58-141680 8/1983 Japan.
92/02983 2/1992 WIPO.

OTHER PUBLICATIONS

A publication by Siemens Semiconductor, Industrial ICs, dated Dec. 15, 1989 illustrating a switch mode power supply that includes a transistor T.
A publication entitled Power Supply Controls published by Unitrode Integrated Circuit. No Date.

*Primary Examiner*—Steven L. Stephan
*Assistant Examiner*—Y. Jessica Han
*Attorney, Agent, or Firm*—Joseph S. Tripoli; Joseph J. Laks; Sammy S. Henig

[57] ABSTRACT

A full wave rectified AC mains supply voltage is produced from an AC mains supply voltage without low-pass filtering. The rectified voltage is developed in a winding of a flyback transformer. The winding of the flyback transformer is also coupled to a switching transistor that generates in the winding a first plurality of current pulses at a frequency that is higher than the frequency of the mains supply voltage. The current pulses energize a load circuit. A capacitor voltage is coupled via a second switching transistor to the winding to produce in the winding a second plurality of current pulses that energize the load circuit during a portion of the period of the mains supply voltage that does not occur in the vicinity of the peak of the mains supply voltage. When the second plurality of current pulses are generated, the mains supply voltage is decoupled from the first winding.

30 Claims, 7 Drawing Sheets

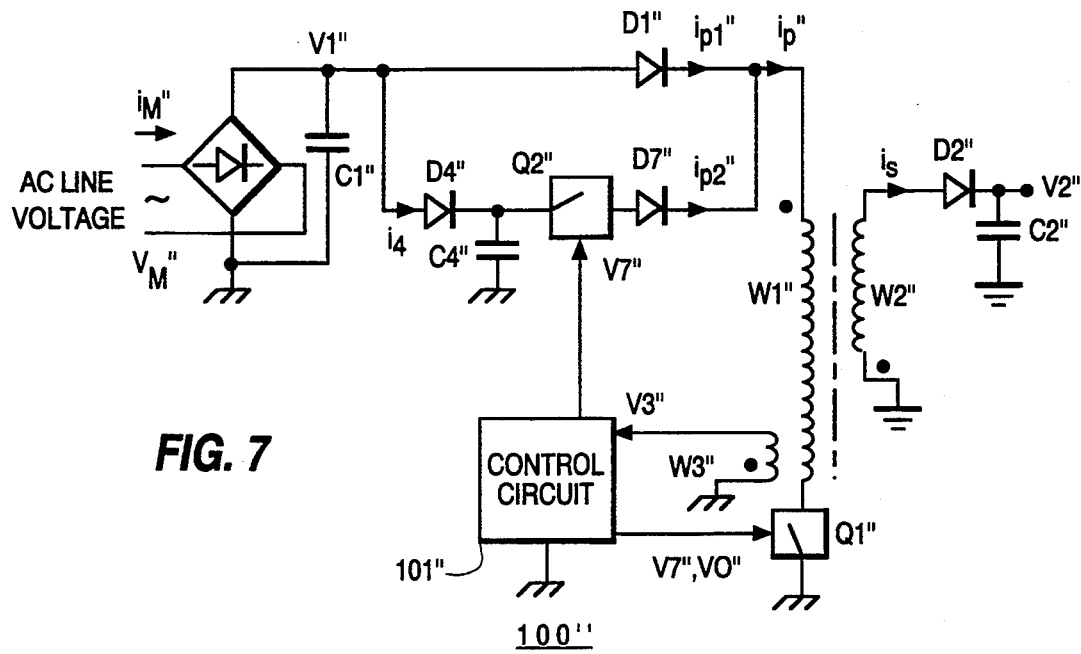
FIG. 7
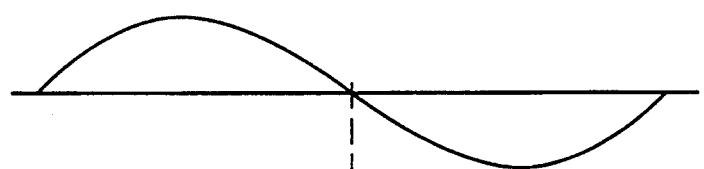
FIG. 8a $V_M"$
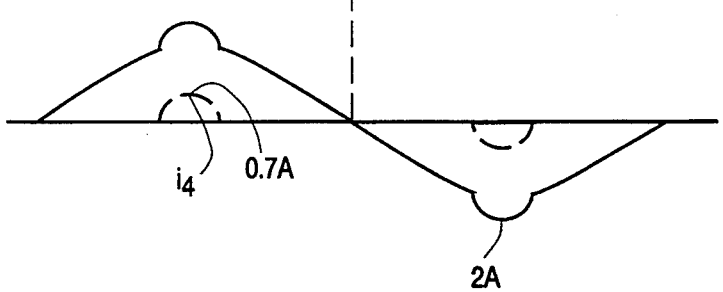
FIG. 8b $i_M"$

SWITCH MODE POWER SUPPLY WITH REDUCED INPUT CURRENT DISTORTION

This is a continuation of application Ser. No. 08/077,160, filed Jun. 16, 1993, now abandoned, which is a continuation of application Ser. No. 07/865,159, filed Apr. 8, 1992, now abandoned.

The invention relates to a switch mode power supply (SMPS). In particular, the invention relates to a SMPS that derives a rectified input supply voltage from an AC, mains supply voltage to produce an output supply voltage.

Typically, such SMPS employs a full wave rectifier bridge that rectifies a sinusoidal mains supply voltage and charges an input filter capacitor to produce the rectified input supply voltage. The filter capacitor has a sufficiently large value for reducing, in the input supply voltage, the magnitude of a ripple at the fundamental frequency and at the harmonics of the mains supply voltage. In this way, ripple voltage is prevented from occurring in the output supply voltage.

The filter capacitor draws narrow pulses of input current having a high peak value from the mains supply voltage source. The current pulses occur only at the peaks of the sinusoidal mains supply voltage. Therefore, the waveform of the input current contains undesirable low frequency harmonics of the mains supply voltage frequency. The result is an undesirable decrease in the power factor to about 0.65 and an undesirable increase in distortions of the waveform of the mains supply voltage. Recently, an interest has evolved for revising European Standard EN60 555-2 for the purpose of reducing the permissible low frequency harmonic content of the waveform of the input current. It may be desirable to reduce the low frequency harmonic content of the waveform of the input current without significantly increasing a ripple voltage in the output supply voltage.

In an SMPS, embodying an aspect of the invention, an AC mains supply voltage produced in a mains supply voltage source is rectified to form a rectified mains supply voltage. The rectification operation occurs without low-pass filtering with respect to low frequency voltage components. A winding of a flyback transformer is coupled to the rectified, mains supply voltage, and to a switching transistor. Pulses of current at high frequency that are produced in the transformer by switching operation of the transistor produce an output supply voltage that is applied to a load. The peak amplitudes of the current pulses have an envelope that is similar to a waveform of the rectified voltage. Consequently, a ratio between the mains supply voltage and a mains supply current remains constant, during at least a substantial portion of the mains supply voltage. Pulses of current that are produced in the transformer are stored in a capacitor. Pulses of current are produced from the stored charge in the capacitor and re-circulated through the transformer in subsequent cycles, during a portion of the period of the mains supply voltage when the mains supply voltage is low. The re-circulated current is applied to the load so as to reduce a ripple voltage in the output supply voltage.

A switch mode power supply, embodying a further aspect of the invention, includes a source of an AC, mains supply voltage, an inductance and a first switching arrangement coupled to the mains source and responsive to a switching signal. A first plurality of current pulses are generated in the inductance at a frequency that is substantially higher than that of the mains supply voltage. During a first portion of a given period remote from a peak of the mains supply voltage, when the mains supply voltage decreases, the decrease causes a concurrent decrease in amplitudes of the first plurality of current pulses and in a level of a mains supply current supplied from the mains source. Second switching arrangement is coupled to the inductance for generating a second plurality of current pulses in the inductance at a frequency that is substantially higher than that of the mains supply voltage. The second plurality of current pulses are generated at least during the first portion of the given period of the mains supply voltage. An output supply voltage and an output supply current are generated in a load circuit from the first and second pluralities of current pulses.

FIG. 7 illustrates an SMPS, embodying a further aspect of the invention; and

FIGS. 8a and 8b are waveforms useful for explaining the operation of the SMPS of FIG. 7.

Figure 1:
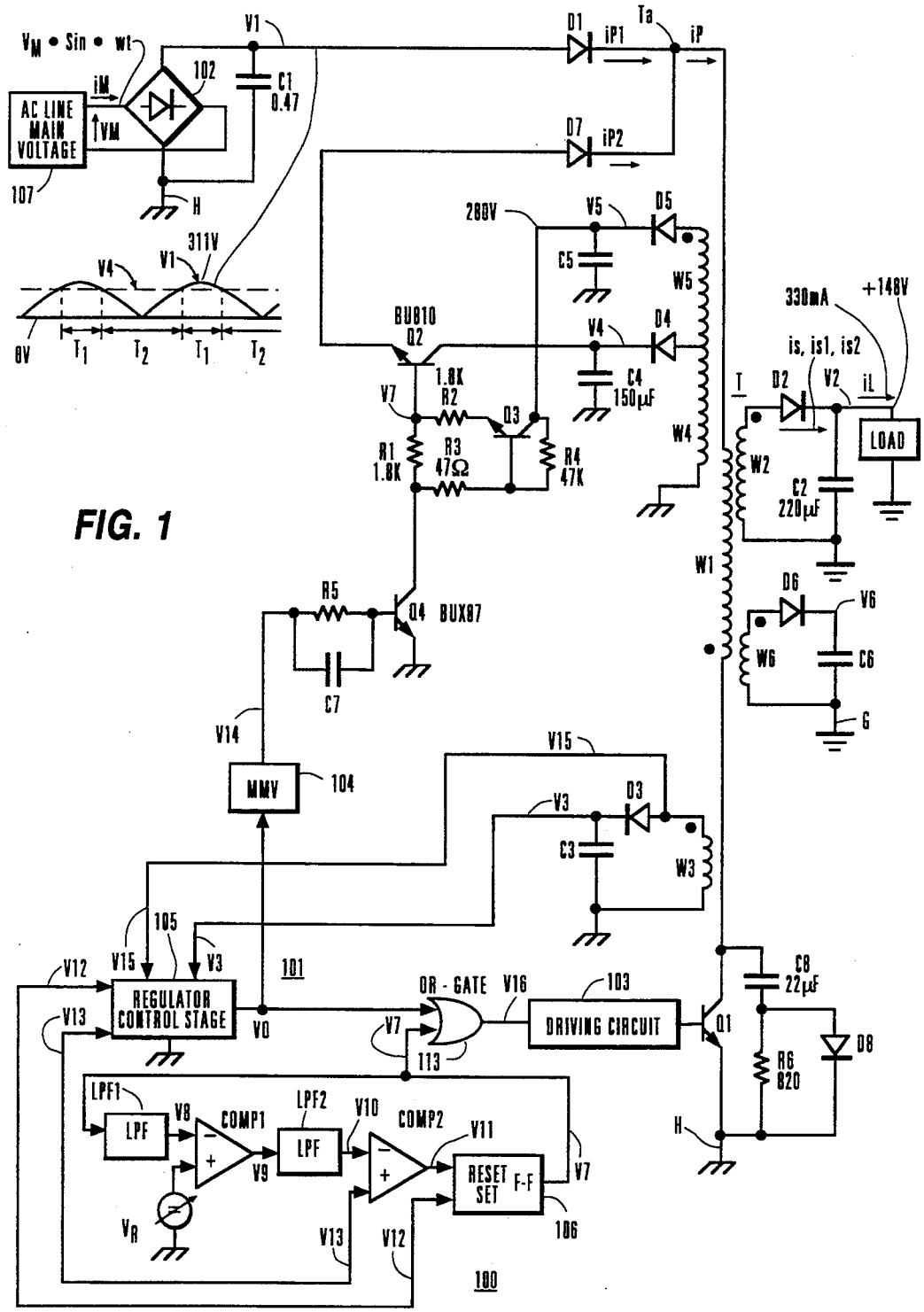
FIG. 1 illustrates an SMPS, embodying an aspect of the invention, that utilizes a current interleaving technique.

FIG. 1 illustrates an SMPS 100, embodying an aspect of the invention, that utilizes a technique, referred to herein as current interleaving technique. A mains supply voltage source 107 that produced an AC voltage VM is coupled to a full-wave bridge rectifier 102 that produces an AC full-wave rectified input supply voltage V1 in a relatively small filter capacitor C1. AC voltage VM of source 107 is sinusoidal at, for example, a frequency of 50 Hz. Because of the small capacitance of capacitor C1, voltage VM is rectified without significant low-pass filtering with respect to the frequency of voltage VM. Therefore, low frequency harmonics of voltage V1 are not filtered out. Voltage V1, that is a fullwave rectified voltage, is coupled via a switching diode D1 to a primary winding W1 of a flyback transformer T.

A switching signal V0, having a controllable duty cycle, is coupled via an "OR" gate 113 to produce a switching signal V16. Signal V16 is coupled via a conventional driver stage 103 to a base of a switching transistor Q1 to turn on transistor Q1 only when signal V0 is at a HIGH level. The frequency of signal V0 is selected to be within a range of 20–50 KHz, as determined by an oscillator, not shown, of a control circuit 101.

In a given cycle of signal V0, after signal V0 attains the HIGH level, magnetic energy is stored in transformer T and an upramping current ip1 or ip is produced in winding W1. In such given cycle, immediately after signal V0 becomes LOW, transistor Q1 becomes non-conductive and a flyback operation occurs to produce a flyback pulse current is1 in a given secondary winding of transformer T. The collector voltage of transistor Q1 is limited by means of a snubber circuit that includes a capacitor C8, a resistor R6 and a diode D8.

As a result of flyback current pulses is1 that are produced from pulses ip1, an output supply voltage V2 and an output supply voltage V6 are produced in capacitors C2 and C6. Voltages V2 and V6 are produced by rectifying, in diodes D2 and D6, flyback pulse voltages of secondary windings W2 and W6, respectively, of transformer T when transistor Q1 becomes nonconductive. Voltages V2 and V6 may be used for energizing loads such as a horizontal output stage and an audio stage, respectively, of a television receiver, not shown.

Transformer T may be used for isolating, with respect to electrical shock hazard, source 107 and a "hot" ground conductor, H, from a "cold" ground conductor G. Secondary windings W3, W4 and W5 produce flyback pulse voltages that are rectified by diodes D3, D4 and D5 to produce DC, rectified voltages V3, V4 and V5 with low ripple in filter capacitors C3, C4 and C5, respectively. Voltages V3, V4 and V5 are referenced to hot ground conductor H. Whereas, voltages V2 and V6 are referenced to cold ground conductor G.

DC sense voltage V3 that is indicative of voltages V2 and V6 is applied to a differential amplifier, not shown, of a regulator control stage 105 of circuit 101. Voltage V3 is compared with a reference voltage, not shown. An error voltage, not shown, is produced from a difference between voltage V3 and the reference voltage. The error voltage is used to control, in a conventional manner, a pulse-width or duty cycle of signal V0 to regulate the levels of output voltages V2 and V6. When signal V0 is HIGH, transistor Q1 is conductive, and a pulse of a current ip1 flows via diode D1 to provide current ip in winding W1.

A ratio between the peak amplitudes of the pulses of current ip1 and between the instantaneous value of voltage VM or of full-wave rectified voltage V1 is maintained constant throughout the period of voltage VM or V1. Since voltage V1 has a full-wave rectified sinusoidal waveform, the peaks or envelope of current ip1 also varies in full-wave rectified sinusoidal manner. Consequently, an AC current iM that is supplied from source 107 varies, advantageously, in a sinusoidal manner at the frequency and phase of voltage VM, and with relatively small amount of low order harmonics distortion.

The amplitudes of the pulses of current ip1 significantly decrease, during a given period of voltage V1, when voltage V1 decreases. Therefore, had only current ip1 been produced in winding W1, voltage V2 would tend to have a significant ripple voltage. It may be desirable to reduce the ripple voltage.

FIGS. 2a–2k illustrate waveforms useful for explaining the operation of SMPS 100 of FIG. 1. Similar symbols and numerals in FIGS. 1 and 2a–2k indicate similar items or functions. The falling edge of signal V0 of FIG. 2b triggers a monostable multivibrator (MMV) 104 of FIG. 1 that produces a signal V14 at a LOW level with a predetermined pulse width. Signal V14 is coupled to a base of a switching transistor Q4 via a pulse shaping parallel arrangement of a resistor R5 and a capacitor C7. As a result of the falling edge of signal V0, signal V14 of MMV 104 attains the LOW level and transistor Q4 becomes nonconductive. The collector of transistor Q4 is coupled to a base of a series pass switching transistor Q2 to control the switching operation of transistor Q2.

Transistor Q2 is switched on by a drive current that is supplied via an arrangement formed by a transistor Q3 and resistors R1, R2, R3 arid R4. Transistors Q3 and Q2 are turned on when transistor Q4 becomes nonconductive, immediately following the falling edge of signal V0. Forward-biased transistor Q2 couples DC voltage V4 to an anode of a switching diode D7 having a cathode that is coupled to a junction terminal Ta, between a cathode of diode D1 and winding W1. As long as transistor Q1 is nonconductive, following the falling edge of signal V0, no current is supplied to winding W1 via diode D7 and transistor Q2.

Figure 2:
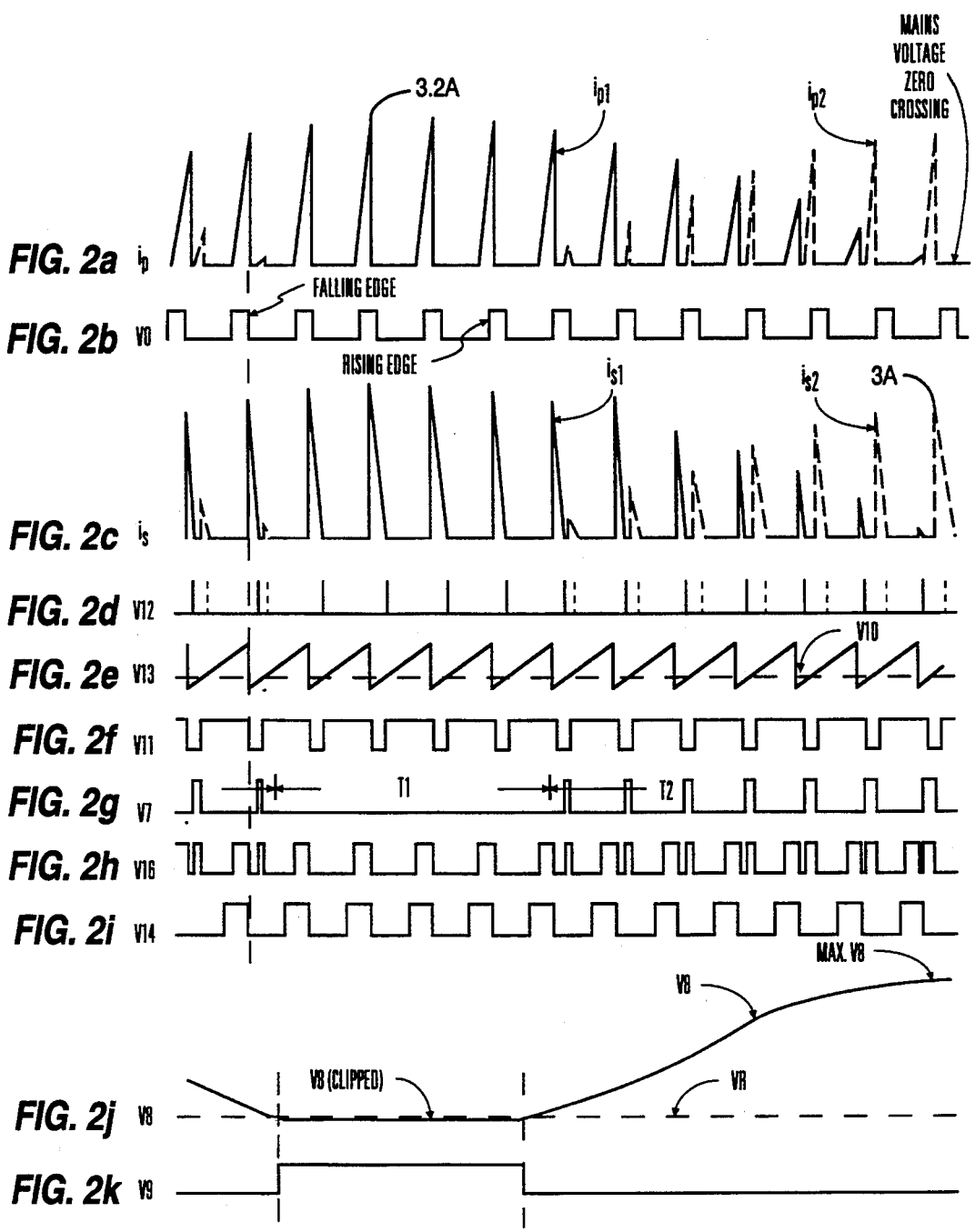
FIGS. 2a–2k illustrate waveforms useful for explaining the operation of the SMPS of FIG. 1.

The falling edge of signal V0 of FIG. 2b also triggers a sawtooth generator, not shown, in stage 105 that produces a sawtooth signal V13 of FIG. 2e. Sawtooth signal V13 is compared in a comparator COMP2 with a controllable slicing voltage V10. Voltage V10 has a level that is shown as a broken line in FIG. 2e. For a given cycle of voltage VM or V1 of FIG. 1, voltage V10 is constant. Immediately after the falling edge of signal V0, when signal V13 is smaller than voltage V10, an output signal V11 of comparator COMP2 is at a LOW level.

Signal V11 is applied to a reset input of a flip-flop (FF) 106. F-F 106 is not affected by signal V11, as long as signal V11 is at the LOW level. Prior to the falling edge of signal V0, signal V11 is at the HIGH level. Consequently, signal V11 maintains an output signal V7 of F-F 106 at the LOW level.

An unrectified, flyback voltage V15, across winding W3, is indicative of an instant when the magnetic energy in transformer T, or a secondary current is, becomes zero. Current is or is1 becomes zero following the falling edge of signal V0. Circuit 105 generates a narrow pulse signal V12 of FIG. 2d when current is of FIG. 2c becomes zero. The leading edge of pulse signal V12 of FIG. 2d triggers F-F 106 of FIG. 1 to a "set" state. As a result, output signal V7 of FIG. 2g of F-F 106 of FIG. 1 attains a HIGH level immediately after the magnetic energy has decayed in transformer T.

Transistor Q1 is also controlled by signal V7 that is coupled via "OR" gate 113. Signals V0 and V7 cannot occur simultaneously at the active HIGH levels. When, in a given cycle, signal V7 attains the HIGH level, transistor Q1 begins conducting.

In accordance with an inventive feature, transistor Q2, that is already forward biased, as explained before, begins conducting a pulse of a current ip2 in winding W1, and diode D1 becomes back-biased. In a given cycle of signal V0, for example, primary current ip2 increases in an upramping manner until F-F 106 is reset by signal V11. As a result, a pulse of current is2 is produced in a given secondary winding of transformer T in a flyback mode of operation. The pulses of currents ip2 and is2 are shown in broken lines in FIGS. 2a and 2c. When current is2 ceases, the pulse of signal V12 of FIG. 2d is produced but has no effect on F-F 106 since F-F 106 is already reset.

Signal V14 of FIG. 2i, at the LOW level, changes to the HIGH level, prior to the occurrence of a rising edge of signal V0 of FIG. 2b, in accordance with pulse-width determining parameters of MMV 104. When signal V14 becomes HIGH, transistor Q4 becomes conductive that causes transistor Q2 to become nonconductive. A new cycle begins at the rising edge of the following pulse of signal V0 of FIG. 2b. Signal V14 remains at the HIGH level until signal V0 attains the LOW level, so as to maintain transistor Q2 nonconductive.

The time difference between the falling edge of signal V0 and the leading edge of signal V12 or V7 varies as a function of the instantaneous value of voltage V1 or VM or the peak of current ip1 or is1 within a given period of voltage V1 or VM. The smaller is voltage V1, the earlier is the occurrence of the leading edge of signal V7. Voltage V10 is constant for a given period of voltage V1. Therefore, signal V11 attains the HIGH level and signal V7 attains the LOW level at the same time, with respect to signal V0, in each cycle throughout the period voltage V1. Thus, the pulse-width of signal V7 is modulated or varies during the period of voltage V1. The pulse-width of signal V7 decreases when voltage V1 or current ip1 increases, and vice versa. When, for example, voltage V11 is zero, the pulse-width of signal V7 is at a maximum. During the given period of voltage V1 of FIG. 1, as voltage V1, for example, decreases, the peaks of the pulses of current ip1 or current is1 of FIG. 2a and FIG. 2c, respectively, also decrease, as shown in solid lines.

In accordance with an aspect of the invention, during a portion of the period of voltage V1 of FIG. 1, when the peaks of the pulses of current ip1 of FIG. 2a or current is 1 of FIG. 2c, for example, decrease, the peak and pulse-width of each of the pulses of current ip2 or is2 increase, as shown in broken lines in FIGS. 2a and 2c. When the pulse-width and amplitude of the pulses of, for example, current is2 of FIG. 2c increase, additional energy is supplied to the load. The additional energy is supplied to the load via current is2 of FIG. 1 when the energy that is supplied to the load by the pulses of current ip1 of is1 is diminished. Therefore, the reduction in the amplitude of the pulses of current ip1 or is1 that tends to produce the ripple voltage in, for example, voltage V2 is, advantageously, reduced by the current pulses of current ip2 or is2.

It may be desirable to, for example, increase the pulse-width of the pulses of signal V7 in each cycle of signal V7 when the loading of capacitor C2 increases so as to control current ip2. To that end, current ip2 is controlled by controlling the pulse-width of signal V7 in a close loop manner. The pulse-width of signal V7 is determined by set and reset signals V12 and V11, as explained before. Signal V12 ensures that the pulse of current ip2 starts to flow after the pulse of secondary current is1 has decayed to zero. Signal V11 determines the amplitude of current ip2.

In the closed-loop operation, signal V7 is demodulated by applying signal V7 via a low pass filter LPF1. A resulting low-pass filtered signal V8 has a waveform that is illustrated in FIG. 2j. During a first portion of the cycle of voltage VM, signal V8 varies as a function of $\cos\omega t$, where "t" denotes time and "$\omega$" denotes the radian velocity; whereas, voltage VM of FIG. 1 varies as a function of $\sin \omega t$. Thus, pulse-width modulated signal V7 is transformed to an equivalent signal, signal V8, having an amplitude and a DC, average level that are determined in accordance with the pulse-width of signal V7. Signal V8 provides a relative measure for the power required to compensate for a reduction in the input power derived from mains supply voltage source 107, during a given period of voltage V1. For example, at mains voltage VM zero crossing, the input power from source 107 is zero. When the input power from source 107 is zero, a maximum pulse-width of signal V7 and a peak of signal V8 occur, indicating that SMPS 100 requires maximum power compensation via the pulses of current ip2. On the other hand, in a second portion of the cycle of voltage V1 or VM, in the vicinity of an instant when the input power is at a maximum, signal V8 is a minimum, a shown in broken lines, and no power compensation is required.

Signal V8 is compared with a reference voltage VR in a comparator COMP1. The level of voltage VR is shown in FIG. 2j as a broken line. An output signal V9 of comparator COMP1 is produced when signal V8 is smaller than voltage VR. Signal V9 is applied to an input of a second low pass filter LPF2. Low pass filter LPF2 produces slicing voltage V10 that is used as a slicing level for comparator COMP2.

Assume, for example, that an increase in loading of capacitor C2 occurs. Therefore the pulse of signal V12 and the leading edge of signal V7 occur later in a given cycle of signal V0. Therefore, the pulse-width of each of the pulses of signal V7 tends to decrease, throughout the period of voltage VM. The result is that the average value of signal V8 becomes less positive. The decrease in the average value of signal V8 of FIG. 2j tends to increase the pulse-width of signal V9 of FIG. 2k. As a result, the level of voltage V10 becomes more positive. Consequently, the leading edges of the pulses of signal V11 of FIG. 2f are more delayed or occur later within a given period of, for example, signal V0. Therefore, advantageously, the pulse-width of signal V7 in each cycle, when signal V7 occurs, increases. The increase in the pulse-width of signal V7 causes the average value of signal V8 to increase in a manner to attain steady state operation. In this way, steady-state operation is maintained when a change in loading occurs in a manner to vary the amplitude of current is2 as a function of loading.

Signal V11 of FIG. 2f causes FF 106 to be at the "reset" state throughout an interval, T1, of FIG. 2g of voltage VM of FIG. 1. The value of voltage VR of FIG. 1 determines the length of interval T1 of FIG. 2g. Throughout interval T1, signal V7 is maintained continuously at the LOW level. Thus, signal V11 prevents the generation of the pulses of current ip2 or is2, throughout interval T1 of FIG. 2g. Interval T1 occurs in the vicinity of the peak of voltage V1 or VM, when the pulses of current ip1 or is1 are sufficiently large to energize the load. Maintaining interval T1 for an entire range of loading and input voltage VM conditions provides protection feature against an undesirable mode of operation of SMPS 100 of FIG. 1. For example, had interval T1 not been maintained, capacitor C4 might have been overloaded.

Figure 3:
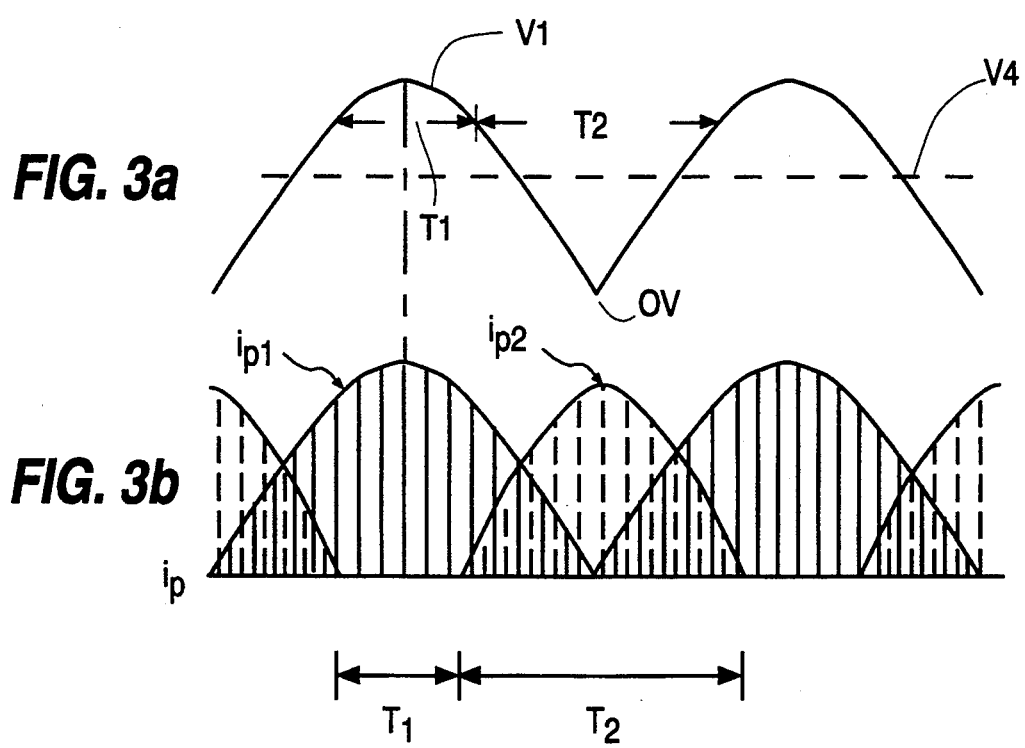
FIGS. 3a and 3b illustrate additional waveforms useful for explaining the operation of the SMPS of FIG. 1.

FIG. 3b illustrates schematically the peaks or envelope of the pulses of currents ip1 and ip2 in a given period of voltage V1 of FIG. 2a. Similar symbols and numerals in FIGS. 1, 2a–2k and 3a–3b indicate similar items or functions. During interval T1 of FIG. 3b that occurs in the vicinity of the peak of voltage V1 of FIG. 3a, the pulses of current ip2 are disabled. Whereas, during the rest of the period, an interval T2, they are enabled. During interval T2, voltage V4 is larger than voltage V1, for proper operation.

Figure 4:
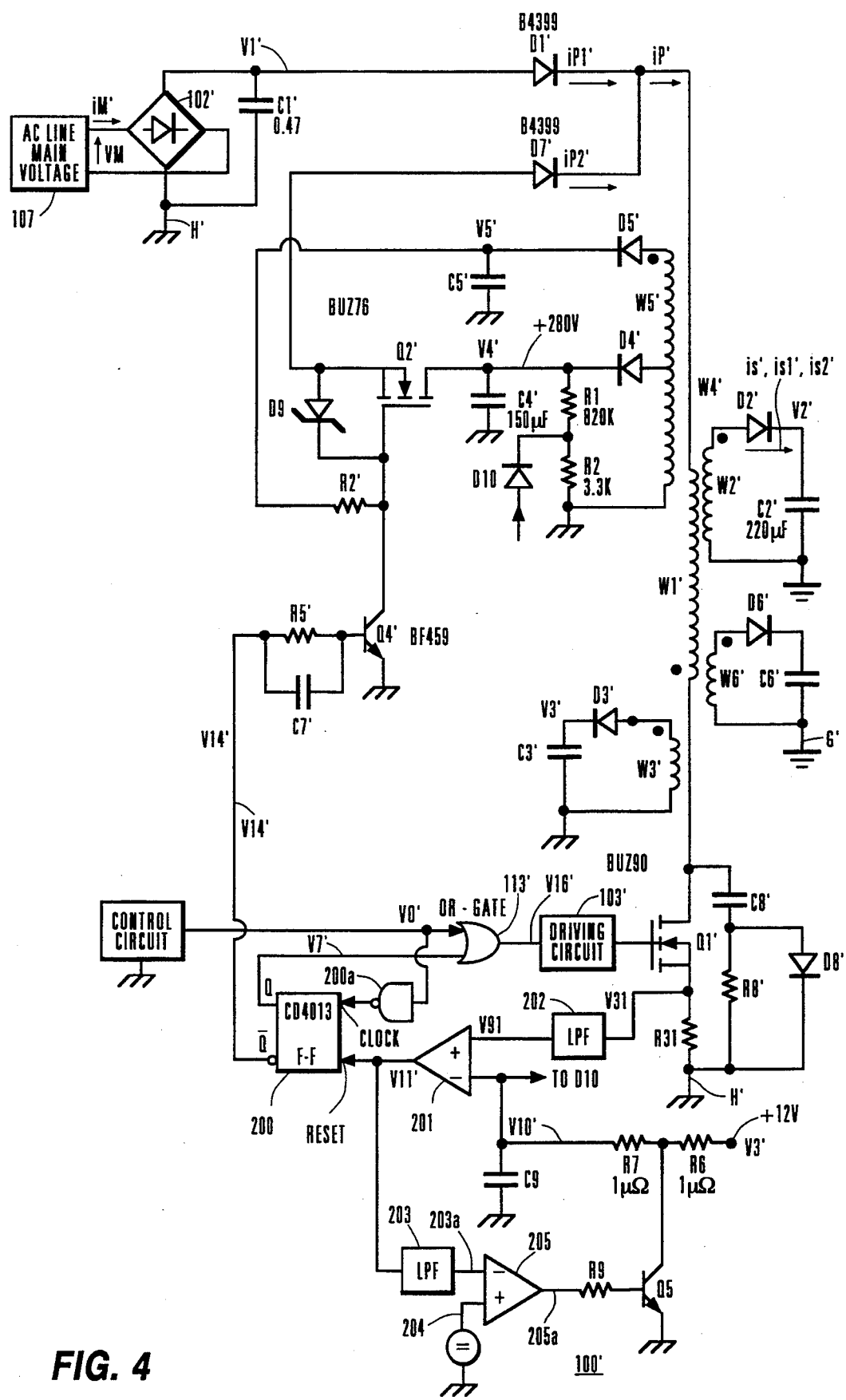
FIG. 4 illustrates an SMPS, embodying another aspect of the invention, that utilizes a current superposition technique.

FIG. 4 illustrates an SMPS 100', embodying another aspect of the invention, that utilizes a technique referred to herein as a current superposition technique. FIGS. 5a–5f illustrate waveforms useful for explaining the operation of SMPS 100' of FIG. 4. Similar symbols and numerals in FIGS. 1, 4 and 5a–5f indicate similar items or functions, except that in FIGS. 4 and 5a–5f the symbol (') is added.

Figure 5:
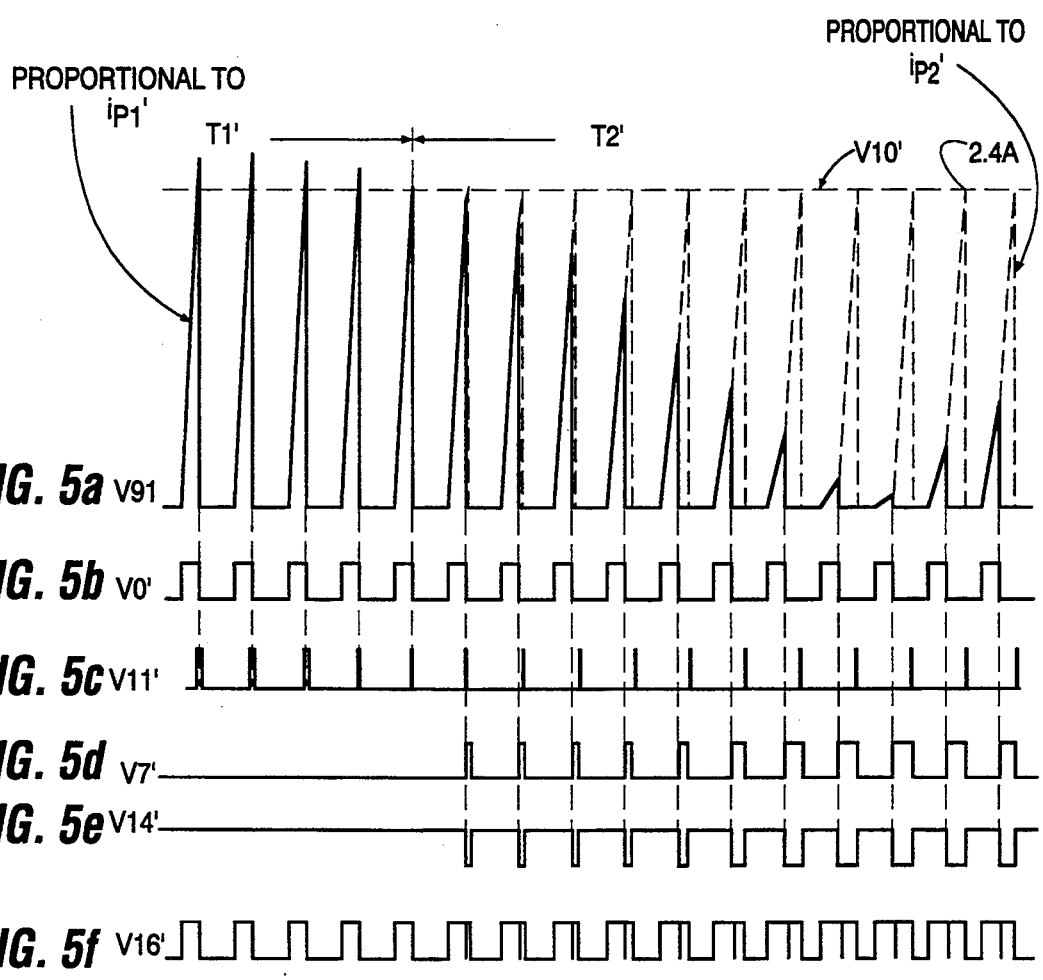
FIGS. 5a–5f illustrate waveforms useful for explaining the operation of the SMPS of FIG. 4.

In FIG. 4, transistors Q1' and Q2' are, illustratively, MOS transistors. Transistor Q2' is turned on by a voltage V5' that is more positive by about 15 V than voltage V4'. Transistor Q2' is turned off by a transistor Q4'. A signal V14' at a HIGH level that is produced in an inverting output Q of a flip-flop (FF) 200 causes transistor Q4' to turn on and transistor Q2' to turn off. A protection zener diode D9 limits a gate-source voltage excursions of transistor Q2'. Transistor Q1' is controlled by signals V0' and V7'. Only one of signals V0' and V7' can be at a HIGH level at any one time. Signal V0' controls a primary current component ip1' and signal V7' controls a primary current ip2'. A primary current ip' in a winding W1' is sampled by means of a very low value resistor R31 coupled between the source electrode of transistor Q1' and ground H'. A voltage V31, developed across resistor R31, is proportional to current ip1. Voltage V31 is applied via a low pass filter 202 to remove any existing spikes. A resulting low-pass filtered signal V91 is shown in FIG. 5a. Signal V91 is compared with a slicing voltage V10' that varies in a closed-loop manner in a comparator 201. Voltage V10' is indicated in FIG. 5a as a broken line. The slicing level of voltage V10' relative to signal V91 determines the lengths of intervals T1' and T2'. A resulting signal V11' at an output of comparator 201 is illustrated in FIG. 5c.

A flip-flop (F-F) 200 is set by the falling edge of signal V0' that is coupled via an inverter 200a and reset by the HIGH level of signal V11'. Output signal V7' developed in a non-inverting output Q of F-F 200 is applied to an input of an OR-gate 113'. Signal V14' developed at inverting output Q of F-F 200 is coupled to a resistor R5' and to a capacitor C7'. The parallel combination of resistor R5' and capacitor C7 improves the switching characteristics of transistor Q4'. Control signal V0' is applied to the other input OR-gate 113'.

During a portion of a given cycle of, for example, signal V0', F-F 200 is reset, non-inverting output signal V7' is at the LOW level and inverting output signal V14' is HIGH. Therefore, transistors Q1' and Q2' are turned off and transistor Q4' is turned on. Signal V0' changes, during its cycle, from the LOW to the HIGH level. The change in signal V0' causes transistor Q1' to conduct and each of primary current ip1' and signal V91 to increase in an upramping manner. Should signal V91 reach the level of voltage V10' when signal V0' is at the HIGH level, comparator 201 output signal V11' would attain the HIGH level.

After a predetermined conduction time of transistor Q1', signal V0' changes again to the LOW level that causes signal V91 to be zero. Since signal V91 is also zero, comparator 201 output signal V11' is at the LOW level.

Throughout an interval T1', in the vicinity of the peak of voltage VM', signal V11' attains the HIGH level prior to the instant when signal V0' changes to the LOW level. As a result, F-F 200 cannot be set. Thus, throughout interval T1', control signal V7' remains at the LOW level. Throughout interval T1', after signal V0' changes to the LOW level, primary current ip1' becomes zero. The result is that current ip2' is disabled, throughout interval T1'.

In contrast to the situation during interval T1', during an interval T2' of voltage VM', signal V91 does not reach the level of voltage V10' during the period of signal V0' in which both signal V0' is at the HIGH level and transistor Q1' is conductive. This is so because, during interval T2', the rate of change of current ip1' is smaller than during interval T1' due to the decrease in input voltage VM' or V1'. During interval T2', when signal V0' attains the LOW level, the reset signal V11' is still at the LOW level. Therefore, F-F 200 is set by the falling edge of signal V0'. Thus, when signal V0' becomes LOW, signal V7' changes to the HIGH level.

Transistor Q1' conduction time is now determined by signal V7' which keeps transistor Q1' conducting after signal V0' becomes LOW. The current in transistor Q1' is not disturbed by the fast transition frown being controlled by signal V0' to being controlled by signal V7'. Simultaneously, transistor Q4' is turned off by signal V14' which attains the LOW level. Transistor Q2 immediately conducts, a diode D1' becomes nonconductive and a diode D7' becomes conductive. Input supply voltage V1' is decoupled from a winding W1' and a voltage V4' in a capacitor C4' is coupled to winding W1' via transistor Q2'. In cycles that occur during interval T2', primary current ip2' continues to flow without a gap of time relative to current ip1', as shown in broken lines in FIG. 5a. Voltage V91 also increases until voltage V91 becomes equal to voltage V10'. Then, comparator 201 output signal V11' becomes HIGH that causes F-F 200 to reset. Transistor Q1' is turned off, transistor Q4' is turned on and transistor Q2' is turned off. Thereafter, a new cycle begins. The result is that the current pulses of current ip2' are generated from the charge stored in capacitor C4'and are re-circulated via winding W1', during interval T2'.

Figure 6:
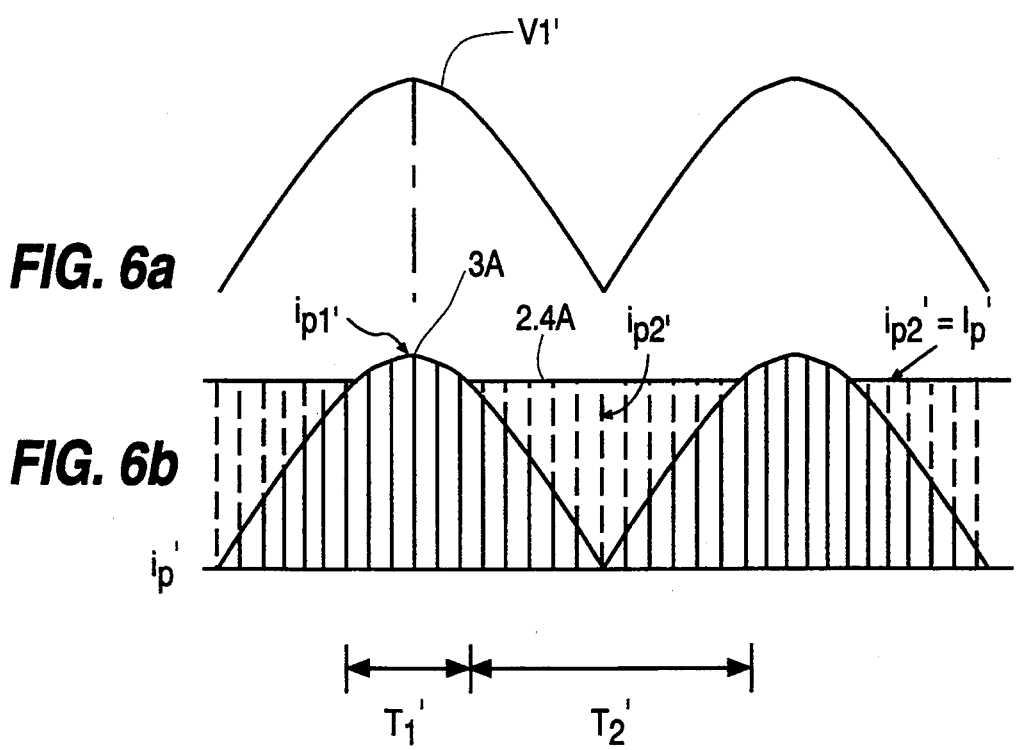
FIGS. 6a and 6b illustrate additional waveforms for the SMPS of FIG. 4.

FIG. 6b illustrates schematically the peaks or envelope of the pulses of currents ip1' and ip2' in a given period of voltage V1' of FIG. 5a. Similar symbols and numerals in FIGS. 4, 5a–5f and 6a–6b indicate similar items or functions. During interval T1' of FIG. 6b, that occurs in the vicinity of the peak of voltage V1' of FIG. 5a, the pulses of current ip2' are disabled. Whereas, during the rest of the period, interval T2', they are enabled.

It may be desirable to vary current ip2' or is2' as a function of current loading of, for example, capacitor C2'. This is achieved by controlling signal V11' in a closed-loop manner. To that end, signal V11' is coupled via a low pass filter 203 to an inverting input terminal of a comparator 205. A reference voltage 204 is developed at a noninverting input terminal of comparator 205. An output signal 205a of comparator 205 is coupled via a resistor R9 to a base of a current sinking switching transistor Q5. A collector of transistor Q5 is coupled to a junction terminal between a resistor R6 and a resistor R7. Resistor R6 and R7 are coupled in series between a voltage V3' and a capacitor C9 to generate a current that charges capacitor C9. The average value of a collector current of transistor Q5 determines the level of voltage V10' that is developed in capacitor C9. Thus, capacitor C9 is discharged via transistor Q5 and is charged via resistor R6. In steady state operation, voltage V10' is constant.

Assume that an increase in current loading in capacitor C2' occurs. Therefore, the peak amplitude of current ip1' and of voltage V31 in resistor R31 increase. Therefore, the pulse-width of signal V11' increases. When the pulse-width of signal V11' increases, an output voltage 203a of low-pass filter 203 becomes larger. When voltage 203a exceeds voltage 204 output signal 205a of comparator 205 attains the LOW level. The result is that transistor Q5 is turned off for a longer interval during a given period of, for example, signal V0'. Thus, the average current in transistor Q5 decreases. Therefore, the level of voltage V10' increases. In this way, the peak level of each pulse of current ip2' increases in a manner to transfer more energy to the load.

Upon turning on the SMPS 100' and prior to steady state operation, voltage V10' is undefined and could be 2 or 3 volts higher than in steady state which might allow excessive current to flow. Therefore capacitor C9 is coupled to a voltage divider that includes a resistor R1 and a resistor R2 through a diode D10. Upon switching on the power supply voltage V4' is zero and diode D10 is coupled to ground potential. As a result, voltage V10' can not be greater than 0.6 V. As the power supply starts to operate, voltage V4' increases. The voltage level across resistor R2 also increases, thereby allowing voltage V10' to increase. The voltage divider that includes resistors R1 and R2 causes diode D10 to be in cut off when voltage V4' reaches its nominal value.

FIG. 7 illustrates an SMPS 100", embodying another aspect of the invention, that utilizes a compromise technique. FIGS. 8a–8b illustrate waveforms useful for explaining the operation of SMPS 100" of FIG. 7. Similar symbols and numerals in FIGS. 1, 4, 7 and 8a–8b indicate similar items or functions, except that in FIGS. 7 and 8a–8b the symbol (") is added. In FIG. 7, switch S1 performs the function of transistors Q1 of FIG. 1, for example, and switch S2 of FIG. 7 performs the function of transistor Q2 of FIG. 1.

Capacitor C4" of FIG. 7 is charged directly from mains supply voltage VM", and not via the transformer, as in FIG. 1 or 4. Therefore, a mains current iM" of FIG. 7 is equal to the sum of the two currents, ip1" and i4. Current ip1" is sinusoidal at the fundamental frequency. Capacitor C4' is charged only during the peaks of mains voltage VM". Thus, current i4 includes narrow, non-sinusoidal current pulses.

The peak value of current i4 is low, because the energy stored in capacitor C4" is used to supply only a portion of a primary current ip" of winding W1". About 65% of the power consumption is obtained by means of current ip1" and 35% by means of current ip2". The resultant current waveform of current iM" is shown in FIG. 8b. Advantageously, the third harmonic of this current waveform is only about 30% of what it would have been had capacitor C1" been a very large capacitor. The fifth harmonic is also reduced. A control circuit 101" in FIG. 7 could be of the type, "current interleaving" of FIG. 1 or of the type, "current superposition" of FIG. 4.

A comparison between the performances of arrangements of FIGS. 1 and 7, when the mains supply voltage is 220 VAC, the input power is 150 W and the output voltage, for example, voltage V2 or V2", is 150 VDC, provides the following results. In the arrangement of FIG. 1, the harmonic content of current iM in $A_{rms}$ is 0.72 at 50 Hz, 0.05 at 150 Hz, 0.038 at 250 Hz and 0.024 at 350 Hz. The power factor is 0.96, the efficiency is 0.72 and the ripple voltage is 1 V. In the arrangement of FIG. 7, the harmonic content of current iM in $A_{rms}$ is 0.72 at 50 Hz, 0.18 at 150 Hz, 0.126 at 250 Hz and 0.09 at 350 Hz. The power factor is 0.92, the efficiency is 0.78 and the ripple voltage is 0.8 V.

The current interleaving technique of FIG. 1 is particularly suitable for an SMPS with a power rating below, for example, 100 W. Whereas, the current superposition technique is suitable for an SMPS with a higher power rating.

What is claimed is:

1. A switch mode power supply, comprising:
a source of an AC, mains supply voltage;
an inductance;
first switching means coupled to said mains source and responsive to a switching signal for generating a first plurality of current pulses in said inductance at a frequency that is substantially higher than that of said mains supply voltage such that, during a first portion of a given period remote from a peak of said mains supply voltage, when said mains supply voltage decreases, the decrease causes a concurrent decrease in amplitudes of said first plurality of current pulses and in a level of a mains supply current supplied from said mains source;
second switching means synchronized to said first switching means and coupled to said inductance for generating a second plurality of current pulses in said inductance at a frequency that is substantially higher than that of said mains supply voltage, said second plurality of current pulses being generated at least during said first portion of said given period of said mains supply voltage;
a load circuit; and
means responsive to said first and second pluralities of current pulses for developing an output supply voltage and an output supply current in said load circuit.

2. A power supply according to claim 1 further comprising, a rectifier for rectifying said first and second pluralities of current pulses to develop said output supply voltage said output supply current, such that said second plurality of current pulses compensate for the decrease in said amplitudes of said first plurality of current pulses in a manner to reduce a ripple component at a frequency that is related to that of said mains supply voltage.

3. A power supply according to claim 1 wherein said second plurality of current pulses are generated in said inductance and wherein said output supply voltage is produced in a flyback manner from said first and second pluralities of current pulses.

4. A power supply according to claim 1 wherein said current pulses of said first and second pluralities of current pulses occur in mutually exclusive intervals within a given period of said switching signal.

5. A power supply according to claim 1 wherein said second plurality of current pulses are generated in said inductance and wherein a given current pulse of one of said first plurality of current pulses occurs adjacent to a given current pulse of said second plurality of current pulses such that there is no time gap between the adjacent pulses.

6. A power supply according to claim 1 further comprising, means for disabling the generation of said second plurality of current pulses throughout a second portion of said period of said mains supply voltage, in a vicinity of said peak voltage of said mains supply voltage.

7. A power supply according to claim 1 further comprising, a pulse-width modulator for pulse-width modulating the current pulses of at least one of said first and said second plurality of current pulses in accordance with said one of said output supply voltage and current in a manner to provide regulation.

8. A power supply according to claim 7 wherein said pulse-width modulator modulates each of said first and second pluralities of current pulses in a manner to provide the regulation.

9. A power supply according to claim 1 wherein said second plurality of current pulses are generated in said inductance and wherein said second plurality of current pulses comprise re-circulated current pulses with respect to said inductance.

10. A power supply according to claim 1 wherein said second plurality of current pulses are generated in said inductance and wherein said inductance is included in a first winding of a transformer.

11. A power supply according to claim 10 further comprising, a second rectifier and a capacitor for rectifying current pulses in a second winding of said transformer that are produced from said first plurality of current pulses to develop a second supply voltage in said capacitor, said second supply voltage being coupled to said second switching means for generating said second plurality of current pulses from said second supply voltage.

12. A power supply according to claim 10 wherein said second switching means couples a second supply voltage to said first winding of said transformer to generate a given pulse of said second plurality of current pulses and wherein said source of mains supply voltage is simultaneously decoupled from said first winding, during a portion of a given period of said switching signal.

13. A power supply according to claim 10 wherein said second plurality of current pulses are produced in a current inter-leaving manner with respect to said first plurality of current pulses.

14. A power supply according to claim 10 wherein said second plurality of current pulses are produced in a current super-position manner with respect to said first plurality of current pulses.

15. A power supply according to claim 10 further comprising, means for generating a second supply voltage from said mains supply voltage via a current path that excludes said transformer wherein said second supply voltage is coupled via said second switching means to said transformer for generating said second plurality of current pulses.

16. A power supply according to claim 10 further comprising, a second rectifier coupled to said mains source for rectifying said mains supply voltage to generate a rectified supply voltage that is coupled to said transformer wherein said rectified supply voltage is developed from said mains supply voltage without significant low-pass filtering with respect to a frequency of said mains supply.

17. A power supply according to claim 10 wherein, during said given period of said mains supply voltage, a ratio between an amplitude of a given current pulse of said first plurality of current pulses and a level of said mains supply voltage that prevails during said given current pulse of said first plurality of current pulses is substantially constant for each current pulse.

18. A switch mode power supply, comprising:
a source of an AC, mains supply voltage;
a flyback transformer;
a rectifier coupled to said mains source for rectifying said mains supply voltage to develop in a first winding of said transformer a first rectified supply voltage such that said rectified supply voltage is developed without low-pass filtering with respect to a frequency and low order harmonics of said mains supply voltage;

first switching means responsive to a switching signal at a frequency that is substantially higher than a frequency of said mains supply voltage for generating a first plurality of current pulses in said first winding;
means generating a second supply voltage; and
second switching means coupled to said transformer and synchronized to said first switching means for coupling said second rectified supply voltage to said transformer and for decoupling said first rectified supply voltage from said transformer to generate in said transformer from said second rectified supply voltage a second plurality of current pulses, such that a given current pulse of said first plurality of current pulses and a given current pulse of said second plurality of current pulses occur, during a given period of said switching signal, said first and second pluralities of current pulses being transformer-coupled via said transformer to a load circuit to develop in said load circuit an output supply voltage and an output supply current.

19. A power supply according to claim 18 further comprising, means for disabling the generation of said second plurality of current pulses throughout a portion of a period of said mains supply voltage, in a vicinity of a peak voltage of said mains supply voltage.

20. A power supply according to claim 18 wherein said second plurality of current pulses are generated during a portion of a period of said main supply voltage when amplitudes of said first plurality of current pulses substantially decrease.

21. A power supply according to claim 18 wherein said second plurality of current pulses are produced in a current inter-leaving manner with respect to said first plurality of current pulses.

22. A power supply according to claim 18 wherein said second plurality of current pulses are produced in a current super-position manner with respect to said first plurality of current pulses.

23. A switch mode power supply, comprising:
a source of an AC mains supply voltage and an AC mains supply current;
first switching means for generating in an inductance that is coupled to said mains source, a first plurality of current pulses at a substantially higher frequency than said frequency of said mains supply voltage, said current pulses being coupled via a rectifier to an output of said power supply to produce a first portion of a rectified output supply current, said first plurality of current pulses having magnitudes that vary during a period of said mains supply voltage in accordance with said mains supply voltage and in a manner to increase a power factor associated with said mains source;
a filter capacitor;
a rectifier coupled to said mains source and to said capacitor for rectifying said mains supply voltage to develop a second plurality of current pulses in said capacitor at a low frequency that is related to said frequency of said mains supply voltage and that is of substantially lower frequency than that of said first plurality of current pulses for producing a rectified second supply voltage at a terminal of said capacitor; and
second switching means for generating, in an inductance that is coupled to said capacitor terminal, a third plurality of current pulses at a substantially higher frequency than said frequency of said mains supply voltage, said third plurality of current pulses being coupled via a rectifier to said output of said power supply to produce a second portion of said rectified output supply current, in a manner to reduce a ripple component at said output of said power supply.

24. A power supply according to claim 23 wherein a given current pulse of said third plurality of current pulses occurs close in time to a corresponding current pulse of said first plurality of current pulses.

25. A switch mode power supply, comprising:
a source of an AC mains supply voltage and an AC mains supply current;
a rectifier coupled to said mains source for developing a second supply voltage at a terminal;
first switching means for generating in an inductance that is coupled to said mains source a first plurality of current pulses at a substantially higher frequency than said frequency of said mains supply voltage, said current pulses being coupled via a rectifier to an output of said power supply to produce a first portion of a rectified output supply current, said first plurality of current pulses having magnitudes that vary during a period of said mains supply voltage, in accordance with said mains supply voltage and in a manner to increase a power factor associated with said mains source; and
second switching means for generating, in an inductance that is coupled to said second supply voltage terminal, a second plurality of current pulses at a substantially higher frequency than said frequency of said mains supply voltage, such that a given current pulse of said second plurality of current pulses occurs close in time to a corresponding current pulse of said first plurality of current pulses, said second plurality of current pulses being coupled via a rectifier to an output of said power supply to produce a second portion of said rectified output supply current in a manner to reduce a ripple component at said output of said power supply.

26. A power supply according to claim 25 wherein a ratio between a magnitude of said current pulse of said first plurality of current pulses and a magnitude of said current pulse that occurs close in time of said second plurality of current pulses varies during said period.

27. A power supply according to claim 26 wherein said ratio decreases when said magnitude of said current pulse of said first plurality of current pulses decreases.

28. A switch mode power supply, comprising:
a source of an AC mains supply voltage;
a rectifier coupled to said mains source for developing a second supply voltage at a terminal;
first switching means for generating in an inductance that is coupled to said mains source a first plurality of current pulses at a substantially higher frequency than said frequency of said mains supply voltage, said current pulses being coupled via a rectifier to an output of said power supply to produce a first portion of a rectified output supply current, said first plurality of current pulses having magnitudes that vary during a period of said mains supply voltage, in accordance with said mains supply voltage and in a manner to increase a power factor associated with said mains source; and
second switching means for generating, in an inductance that is coupled to said second supply voltage terminal, a second plurality of current pulses at a substantially higher frequency than said frequency of said mains supply voltage, said second plurality of current pulses being coupled via a rectifier to an output of said power supply to produce a second portion of said rectified output supply current such that a ratio between a magnitude of a given current pulse of said first plurality of current pulses and a current pulse of said second plurality of current pulses that is adjacent to said given current pulse varies, during said period of said mains supply voltage, in a manner to reduce a ripple component at said output of said power supply.

29. A power supply according to claim 28 wherein a duty cycle of said first plurality of current pulses remains substantially constant and a duty cycle of said second plurality of current pulses varies, during said period of said mains supply voltage.

30. A power supply according to claim 28 wherein both said first and second plurality of current pulses are transformer coupled to a load via the same winding of a transformer.

* * * * *